(12) United States Patent
Sakai et al.

(10) Patent No.: US 10,160,046 B2
(45) Date of Patent: Dec. 25, 2018

(54) MULTI-FLUTE BALL END MILL

(71) Applicant: Mitsubishi Hitachi Tool Engineering, Ltd., Tokyo (JP)

(72) Inventors: Shinjiroh Sakai, Yasu (JP); Mitsuhiro Yokokawa, Yasu (JP); Tomohiro Satou, Yasu (JP)

(73) Assignee: Mitsubishi Hitachi Tool Engineering, Ltd., Tokyo (JP)

( * ) Notice: Subject to any disclaimer, the term of this patent is extended or adjusted under 35 U.S.C. 154(b) by 108 days.

(21) Appl. No.: 15/511,409

(22) PCT Filed: Oct. 26, 2015

(86) PCT No.: PCT/JP2015/080073
§ 371 (c)(1),
(2) Date: Mar. 15, 2017

(87) PCT Pub. No.: WO2016/068064
PCT Pub. Date: May 6, 2016

(65) Prior Publication Data
US 2017/0282261 A1    Oct. 5, 2017

(30) Foreign Application Priority Data
Oct. 28, 2014    (JP) .................... 2014-219718

(51) Int. Cl.
*B23C 5/00*    (2006.01)
*B23C 5/10*    (2006.01)
(52) U.S. Cl.
CPC .............. *B23C 5/1009* (2013.01); *B23C 5/10* (2013.01); *B23C 2210/0428* (2013.01);
(Continued)

(58) Field of Classification Search
CPC ............ B23C 5/1009; B23C 2210/084; B23C 2210/202; B23C 2210/0428;
(Continued)

(56) References Cited

U.S. PATENT DOCUMENTS 4,934,881 A    6/1990    Tsujimura et al.
5,725,338 A    3/1998    Cabaret et al.
(Continued)

FOREIGN PATENT DOCUMENTS

CN    1318444 A    10/2001
CN    103506679 A    1/2014
(Continued)

OTHER PUBLICATIONS

Office Action dated Mar. 19, 2018, issued for the Chinese patent application No. 201580054881.8 and a partial English translation of the Search Report.
(Continued)

*Primary Examiner* — Will Fridie, Jr.
(74) *Attorney, Agent, or Firm* — Locke Lord LLP

(57) ABSTRACT

A multi-flute ball end mill of the present invention includes: a shank portion configured to rotate about a rotational axis; a cutting edge portion; three or more ball edges formed on the cutting edge portion; gashes formed between the ball edges; peripheral cutting edges continuous with end portions of the ball edges on the shank portion side; and flutes formed between the peripheral cutting edges continuously with the gashes. The degree of curvature of the ball edges is 35% to 55%. Each of the gashes includes four faces of a rake face of each of the ball edges, a gash wall face, a first gash face, and a second gash face. The second gash face is formed such that the closer the second gash face is to the rotation center point, the more inwardly the second gash face enters a second face of each of the ball edges.

8 Claims, 8 Drawing Sheets

(52) U.S. Cl.
CPC ............... *B23C 2210/0435* (2013.01); *B23C 2210/202* (2013.01); *B23C 2210/40* (2013.01); *B23C 2210/54* (2013.01); *B23C 2220/60* (2013.01)

(58) Field of Classification Search
CPC ........ B23C 2210/0435; B23C 2210/60; B23C 2210/54; B23C 2210/40
See application file for complete search history.

(56) References Cited

U.S. PATENT DOCUMENTS

| | | | |
|---|---|---|---|
| 2001/0033776 A1 | 10/2001 | Villa | |
| 2007/0081868 A1* | 4/2007 | Osawa | B23C 5/1009 407/54 |
| 2013/0071192 A1* | 3/2013 | Kuroda | B23C 5/10 407/54 |
| 2014/0133926 A1* | 5/2014 | Budda | B23C 5/1009 407/54 |
| 2015/0030396 A1* | 1/2015 | Abe | B23C 5/28 407/11 |
| 2015/0043980 A1* | 2/2015 | Matsumoto | B23C 5/1009 407/54 |
| 2015/0056027 A1* | 2/2015 | Azegami | B23C 5/1009 407/54 |
| 2016/0175948 A1* | 6/2016 | Sakai | B23C 5/1009 407/54 |
| 2016/0250695 A1* | 9/2016 | Baba | B23C 5/10 409/131 |
| 2016/0303664 A1* | 10/2016 | Azegami | B23C 5/1009 |
| 2018/0036809 A1* | 2/2018 | Maeda | B23C 5/10 |

FOREIGN PATENT DOCUMENTS

| | | |
|---|---|---|
| JP | 55-042760 A | 3/1980 |
| JP | 06-218611 A | 8/1994 |
| JP | 2002-187011 A | 7/2002 |
| JP | 2006-015419 A | 1/2006 |
| JP | 3840660 B2 | 11/2006 |
| JP | 4407974 B2 | 2/2010 |
| JP | 2013-202771 A | 10/2013 |

OTHER PUBLICATIONS

Office Action dated Jan. 9, 2018, issued for the Japanese patent application No. 2016-556552 and English translation thereof.
International Search Report dated Nov. 24, 2015, issued for PCT/JP2015/080073 and English translation thereof.

* cited by examiner

MULTI-FLUTE BALL END MILL

TECHNICAL FIELD

The present invention relates to a multi-flute ball end mill according to which high-quality machined surfaces can be obtained even in a case where high-feed rough machining is performed on high-hardness difficult-to-cut materials, such as hot-forged steel used for various kinds of metal dies.

Priority is claimed on Japanese Patent Application No. 2014-219718, filed Oct. 28, 2014, the content of which is incorporated herein by reference.

BACKGROUND ART

As ball end mills with long lifespan that are used for manufacture of various kinds of components in the automobile industry, the electronic industry, or the like and that can cut high-hardness metal dies with high efficiency, multi-flute ball end mills that have three or more ball edges and are made of cemented carbide are widely used.

PTL 1 discloses a ball end mill in which each of ball edges is constituted with a first cutting portion and a second cutting portion, the curvature radius of the first cutting portion is 0.025D or more and 0.10D or less with respect to the external diameter D, and the curvature radius of the second cutting portion is larger than the curvature radius of the first cutting portion. However, in the ball end mill of PTL 1, gashes in the vicinity of a rotation center between the respective ball edges are small. Thus, clogging of chips during high-feed rough machining cannot be prevented.

PTL 2 discloses a ball end mill in which three or more ball edges are provided at a tip and a center web portion is provided at an axial center portion. However, in the ball end mill described in PTL 2, the degree of curvature of ball edges is small. Therefore, there is a concern that the cutting resistance during high-feed rough machining may increase markedly and the cutting performance may degrade.

PTL 3 suggests a ball end mill which has three or more ball edges and in which, in order to solve a shortage of chip pockets in the vicinity of a rotational axis to prevent occurrence of chip clogging, thinning is performed on lands of the respective ball edges and the respective ball edges are cut out in the vicinity of a rotation center. However, in the ball end mill described in PTL 3, a cutting operation cannot be performed by the vicinity of the rotation center. Therefore, there is a high possibility that the machined face quality of a work material may deteriorate in high-feed rough machining.

PTL 4 discloses a ball end mill in which the radial rake angle of ball edges and peripheral cutting edges may be a negative angle. However, in this ball end mill, the degree of curvature of the ball edges is small. Therefore, there is a concern that the cutting resistance during high-feed rough machining may increase markedly and the cutting performance may degrade.

CITATION LIST

Patent Literature

[PTL 1] Japanese Patent No. 4407974
[PTL 2] Japanese Patent No. 3840660
[PTL 3] Japanese Unexamined Patent Application, First Publication No. 2002-187011
[PTL 4] Japanese Unexamined Patent Application, First Publication No. 2006-15419

SUMMARY OF INVENTION

Technical Problem

Therefore, an object of the present invention is to provide a multi-flute ball end mill with three edges or more that can effectively prevent chipping and fracture of ball edges, can smoothly discharge chips, and has improved cutting performance compared to conventional multi-flute ball end mills, even in a case where high-feed rough machining of high-hardness difficult-to-cut materials, such as hot-forged steel, is performed.

Solution to Problem

A multi-flute ball end mill of the present invention includes: a shank portion configured to rotate about a rotational axis; a cutting edge portion having a ball edge portion at a tip thereof, three or more ball edges formed on the ball edge portion of the cutting edge portion; three or more gashes formed between the respective ball edges; three or more peripheral cutting edges continuous with end portions of the ball edges on the shank portion side; and three or more flutes formed between the respective peripheral cutting edges continuously with the respective gashes. The degree of curvature of each of the ball edges is 35% to 55%, the degree being a ratio of a length of a perpendicular line drawn from an apex of a convex curved line of each of the ball edges to a line segment connecting a rotation center point that is an intersection point between the rotational axis and the cutting edge portion with a terminal point of each of the ball edges on the shank portion side with respect to a length of the line segment. Each of the gashes includes four faces of a rake face of each of the ball edges, a gash wall face, a first gash face, and a second gash face, the four faces being continuous in a rotational direction of the multi-flute ball end mill. The second gash face is formed such that the closer the second gash face is to the rotation center point, the more inwardly the second gash face enters a second face of each of the ball edges continuous with a back side of each of the ball edges in the rotational direction.

By virtue of this configuration, the cutting resistance of the ball edges is reduced compared to the conventional multi-flute ball end mills, and the occupation space of a chip pocket formed in each gash is increased. Therefore, the chip discharge performance during rough machining is markedly improved.

Preferably, in a case where the multi-flute ball end mill of the present invention is seen from the tip side thereof, when a circle P centered on the rotation center point O with a diameter of 0.03D to 0.2D where D is the diameter of the cutting edge portion and passing through the gashes is drawn, the second face of each of the ball edges and the second gash face are continuous in this order on a back side of each of the ball edges in the rotational direction on the circumference of the circle P; and a ratio of a length of a circular arc P1-P3 with respect to a length of a circular arc P1-P2 is 3.5 to 6.0, the circular arc P1-P3 being formed by intersection points P1 and P3 where a first ball edge and a second ball edge adjacent to each other intersect with the circle P, and the circular arc P1-P2 being formed by the intersection point P1 and an intersection point P2 that is located on the circumference of the circle P and forms a boundary between the second face of the first ball edge and the second gash face.

By virtue of this configuration, compared to the conventional multi-flute ball end mills, in the vicinity of the rotation center point (inside of a circle with a diameter of 0.03D to 0.2D from the rotation center point O) where the rotating speed is slow and the cutting performance is poor, the occupation area of a chip pocket is increased by increasing the occupation area of each gash to be larger than the occupation area of the second face of each ball edge. Therefore, the chip discharge performance during rough machining is markedly improved.

Preferably, in a case where the multi-flute ball end mill of the present invention is seen from the tip side thereof, when a circle S centered on the rotation center point O with a diameter of 0.4D to 0.6D where D is the diameter of the cutting edge portion and passing through the gashes is drawn, the second face of each of the ball edges, a third face of each of the ball edges, and the gash wall face are continuous in this order on a back side of each of the ball edges in the rotational direction on the circumference of the circle S; and a ratio of a length of a circular arc S1-S3 with respect to a length of a circular arc S1-S2 is 2.1 to 3.3, the circular arc S1-S3 being formed by intersection points S1 and S3 where a first ball edge and a second ball edge adjacent to each other intersect with the circle S, and the circular arc S1-S2 being formed by the intersection point S1 and an intersection point S2 that is located on the circumference of the circle S and forms a boundary between the third face of the first ball edge and the gash wall face.

By virtue of this configuration, compared to the conventional multi-flute ball end mills, in the vicinity of the center of the ball edge portion (inside of a circle with a diameter of 0.4D to 0.6D from the rotation center point O), the rigidity is improved by sufficiently securing the width of the third face of each ball edge, and the occupation area of the chip pockets is increased by increasing the occupation area of the each gash to be larger than the occupation area of the second face of each ball edge. Therefore, the chip discharge performance during rough machining is markedly improved.

In the multi-flute ball end mill of the present invention, at a position apart from the rotation center point toward the shank portion in a direction of the rotational axis by 0.15D where D is the diameter of the cutting edge portion, a radial rake angle of each of the ball edges is preferably −29° to −11°; and a rake angle of each of the peripheral cutting edges is preferably −9° to −1°.

By virtue of this configuration, the rigidity and the edge tip strength of the cutting edges are improved.

Advantageous Effects of Invention

In the multi-flute ball end mill of the present invention, as described above, in order to realize excellent chip discharge performance in high-feed rough machining of high-hardness materials with HRC 40 or more that have been conventionally difficult to cut, the occupation area of a chip pocket is increased by making the occupation space of each gash in the vicinity of the rotation center point and in the vicinity of the center of the ball edge portion to be larger than that in the conventional end mills. Further, the width of the third face of each ball edge is also sufficiently secured and thereby the edge tip rigidity is enhanced. Therefore, an increase in the cutting load of the ball edges during high-feed rough machining is effectively suppressed. Accordingly, occurrence of chipping and breaking is suppressed, and a high-quality machined surface can be obtained.

DESCRIPTION OF EMBODIMENTS

Figure 1:
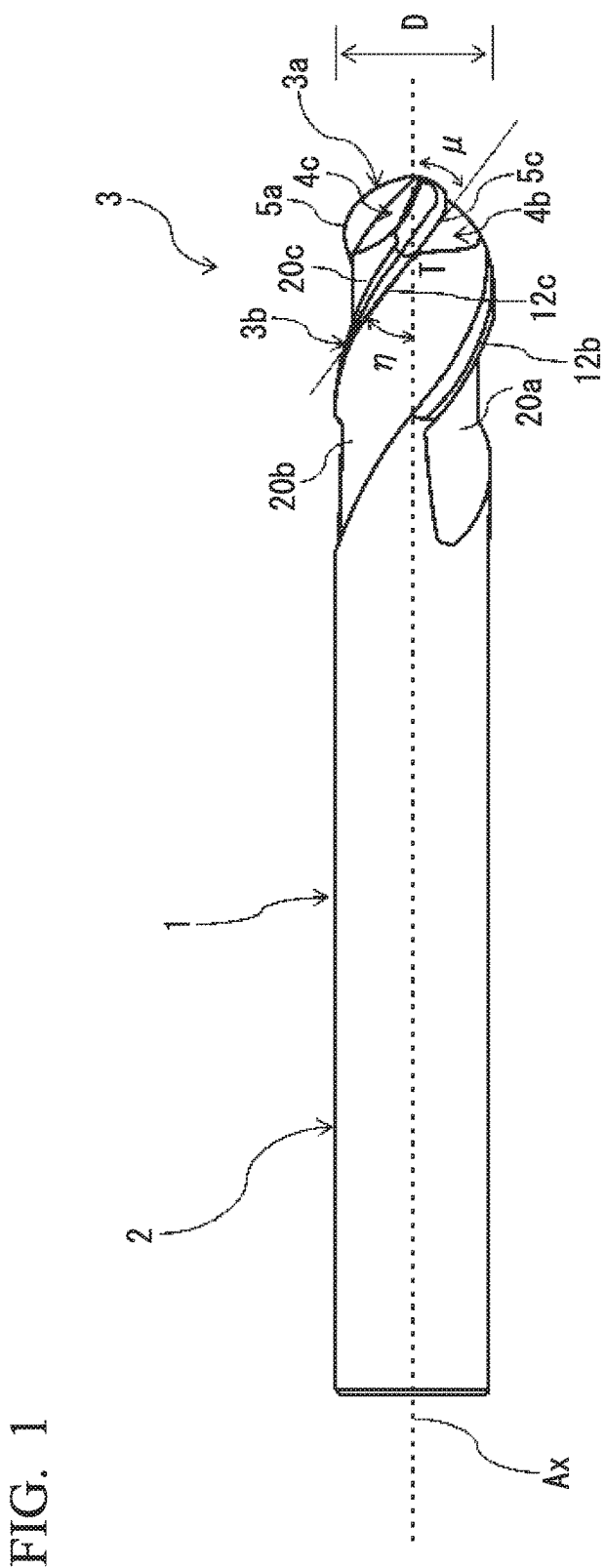
FIG. 1 is a side view showing the three-flute ball end mill according to an embodiment of the present invention.

As an embodiment (hereinafter referred to as "present embodiment") of a multi-flute ball end mill of the present invention, a solid three-flute ball end mill made of cemented carbide will be described below in detail as an example. The multi-flute ball end mill of the present embodiment includes: a shank portion configured to rotate about a rotational axis; and a cutting edge portion provided on a tip side of the shank portion in a direction of the rotational axis. The cutting edge portion has a shape that is rotationally symmetrical around the rotational axis, and has: a ball edge portion formed at a tip of the cutting edge portion in the direction of the rotational axis; and a peripheral cutting edge portion that is continuous with a posterior end of the ball edge portion in the direction of the rotational axis. The ball edge portion has: three or more ball edges; and the same number of gashes as the ball edges, gashes being formed between each adjacent pair of the ball edges. The peripheral cutting edge portion has: the same number of peripheral cutting edges as the ball edges which extend helically up to the shank portion continuously with posterior ends of the respective ball edges in the direction of the rotational axis; and the same number of flutes as the ball edges which are formed between the respective peripheral cutting edges continuously with posterior ends of the respective gashes in the direction of the rotational axis.

It is preferable that the number of cutting edges (ball edges and peripheral cutting edges) of the multi-flute ball end mill of the present embodiment be 3 to 8. If the number of cutting edges is less than 3, high-efficiency machining is difficult, and if the number of cutting edges exceeds 8, there is a concern that the degree of curvature of the ball edges cannot be enlarged. The following description regarding the three-flute ball end mill of the present embodiment is applied to other multi-flute ball end mills, if otherwise mentioned. That is, parameters except for a parameter caused by a difference in the number of cutting edges among parameters to be used on the present specification are in common in all multi-flute ball end mills, and definitions described in the column of the following three-flute ball end mill are applied also to multi-flute ball end mills with other numbers of cutting edges as they are.

A term "high-hardness material" used in the present specification means, for example, metal having a Rockwell hardness HRC of 40 or more, such as hot-forged steel, such as die-casting steel. A term "rough machining" is a cutting operation performed before finish machining, and means machining in which, in order to improve cutting efficiency, depth of cut and feed amount are set to be greater than those in the finish machining and thus cutting load is larger than that in the finish machining. Moreover, a term "high-feed machining" means machining in which, in order to perform a cutting operation with high efficiency, at least any one or more of feed speed Vf, axial depth ap of cut, and radial depth ae of cut are made larger than general machining conditions. In the case of the high-feed machining (high-feed rough machining) of the high-hardness material, for example, in the three-flute ball end mill, it is desirable that the feed speed Vf be 1250 mm/min or more, the axial depth ap of cut be 0.3 mm or more, the radial depth ae of cut be 0.9 mm or more.

The multi-flute ball end mill of the present embodiment is a solid ball end mill made of WC-based cemented carbide. The multi-flute ball end mill made of cemented carbide is produced by molding cemented carbide powder in which Co (cobalt) powder is mixed with WC (tungsten carbide) powder in a columnar shape in metal dies, sintering the obtained compact at about 1300° C., then carrying out a predetermined finish machining on the cutting edge portion or the like, and if necessary, coating the surface of the cutting edge portion with a wear-resistant hard film. The hard film is made of, for example, TiSiN, TiAlSiN, CrSiN, AlCrSiN, or the like. Specifically, it is desirable to coat the above surface with a hard film, which is made of any of nitrides, carbonitrides, and oxynitrides containing one or more kinds of elements selected from 4a, 5a, 6a group metals, and elements of Al, Si, and B on the periodic law table, to a thickness of 3 to 5 μm.

Figure 2:
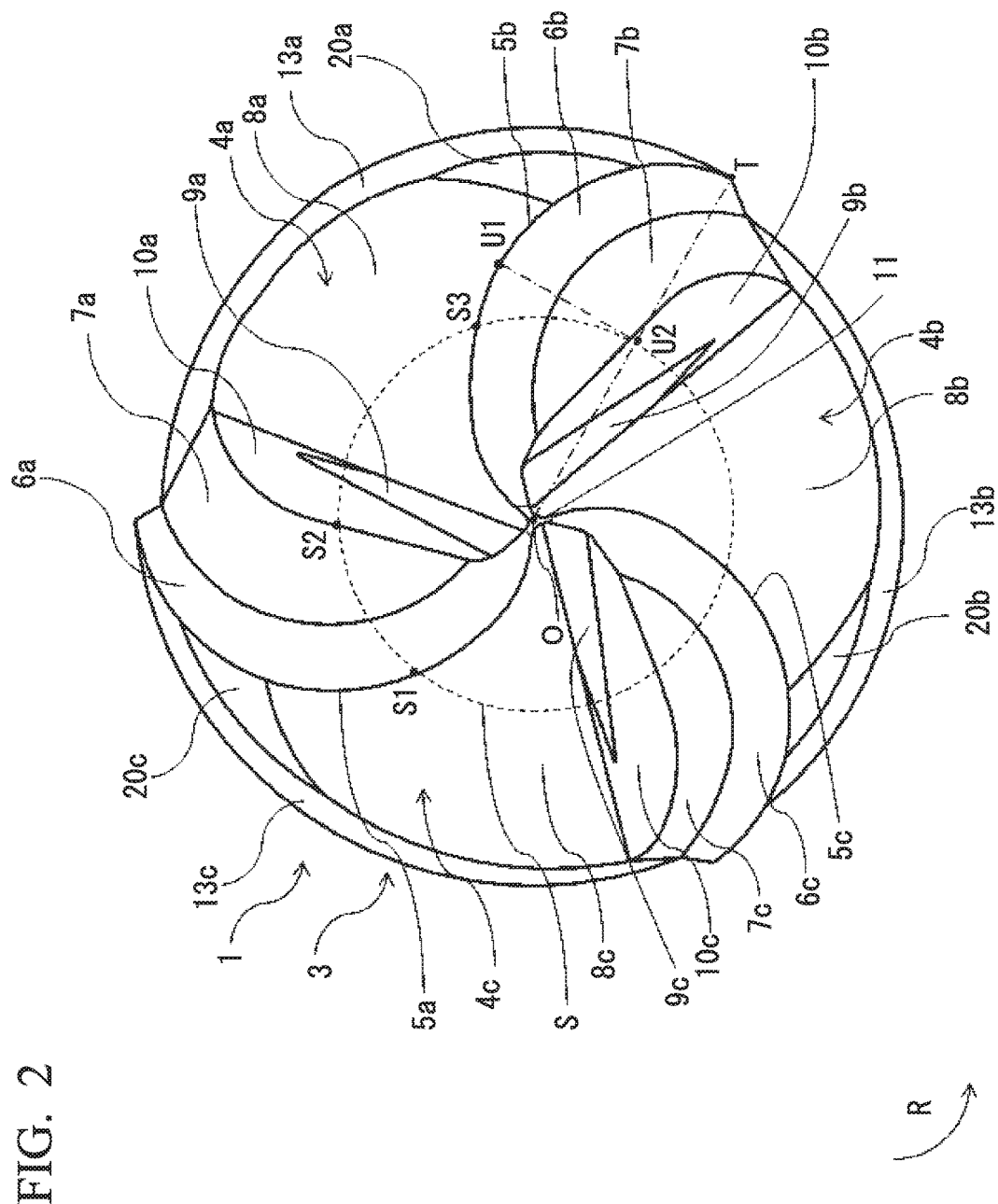
FIG. 2 is a view of a ball edge portion of the three-flute ball end mill of FIG. 1 as seen from a tip side thereof.
Figure 3:
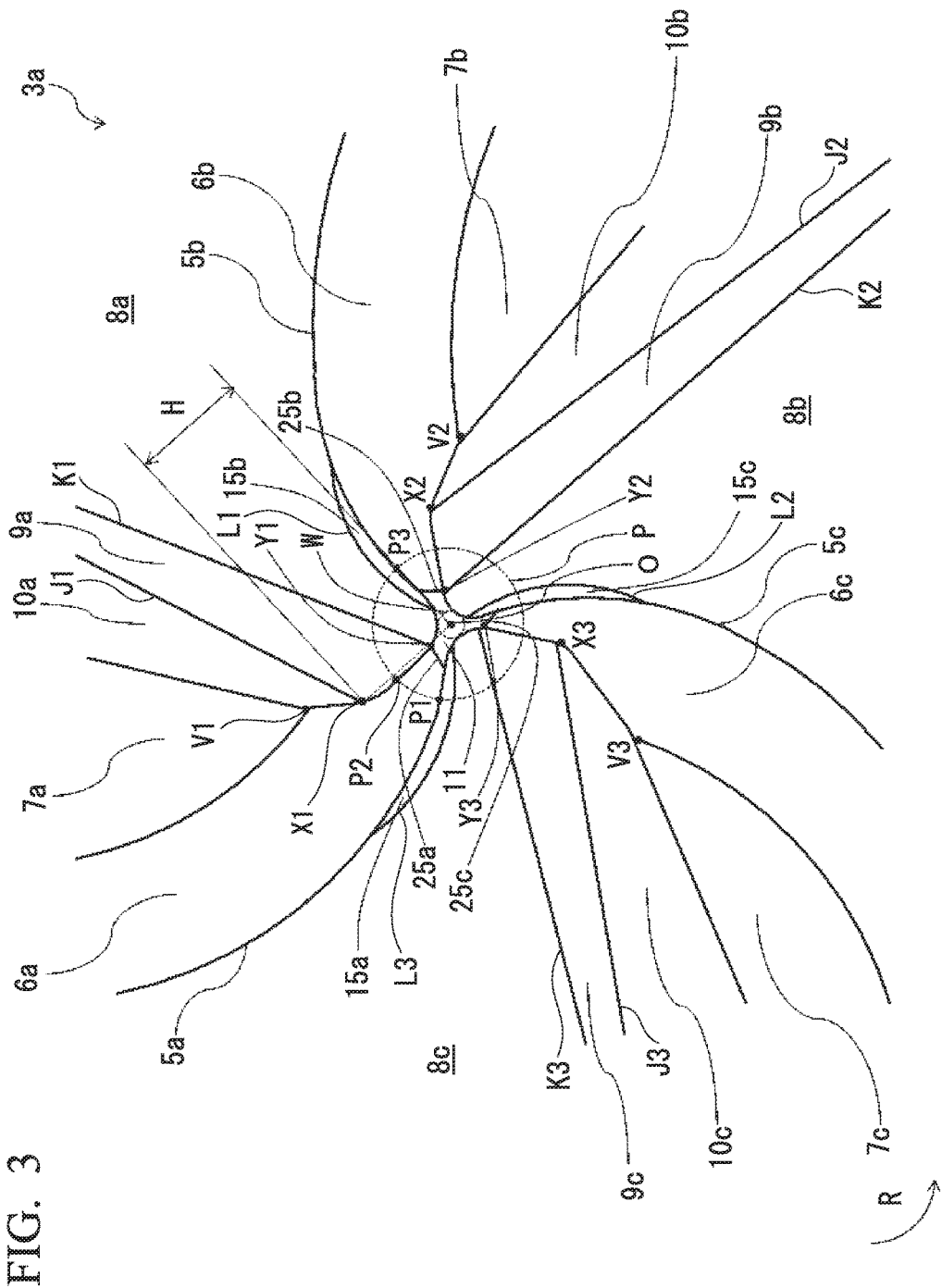
FIG. 3 is a partially enlarged view showing the vicinity of a rotation center of the ball edge portion of the three-flute ball end mill of FIG. 1.
Figure 4:
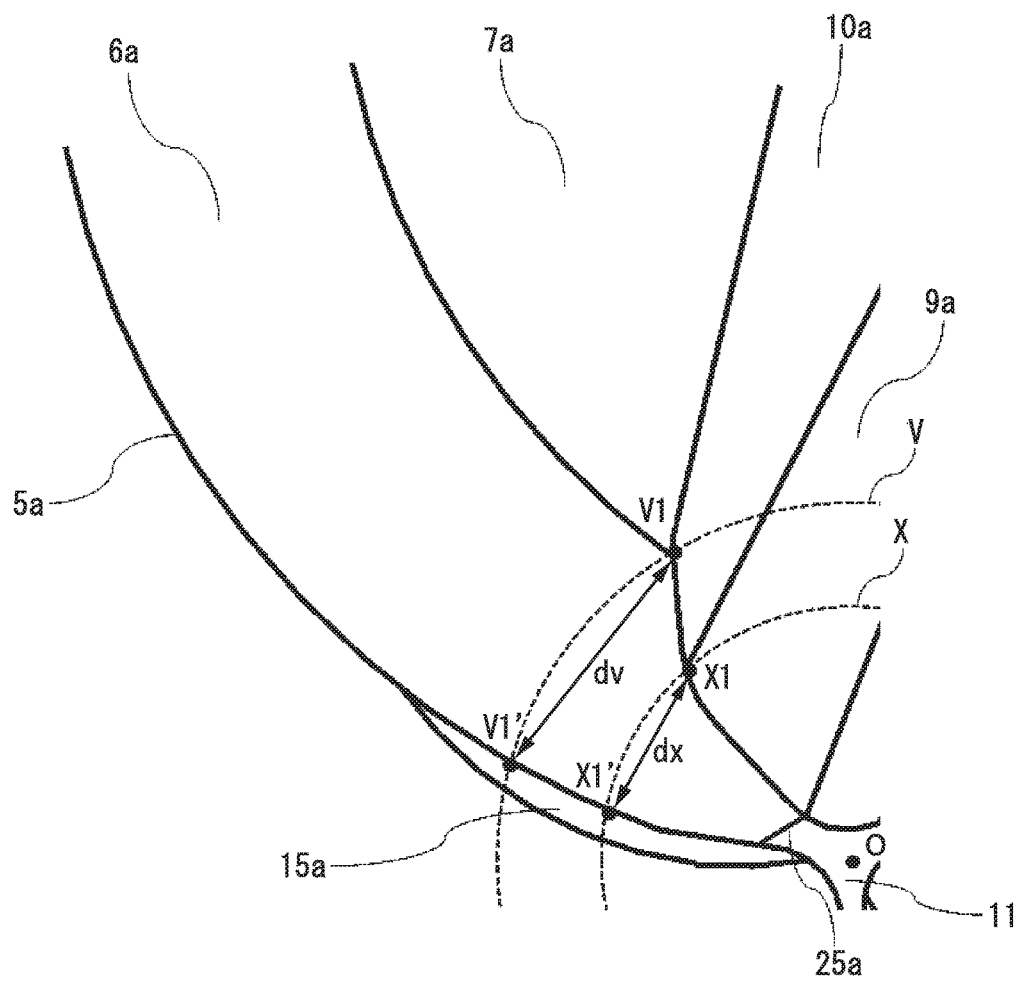
FIG. 4 is a partially enlarged view of FIG. 3 for explaining the width of a second face of a ball edge of the three-flute ball end mill of FIG. 1.
Figure 5:
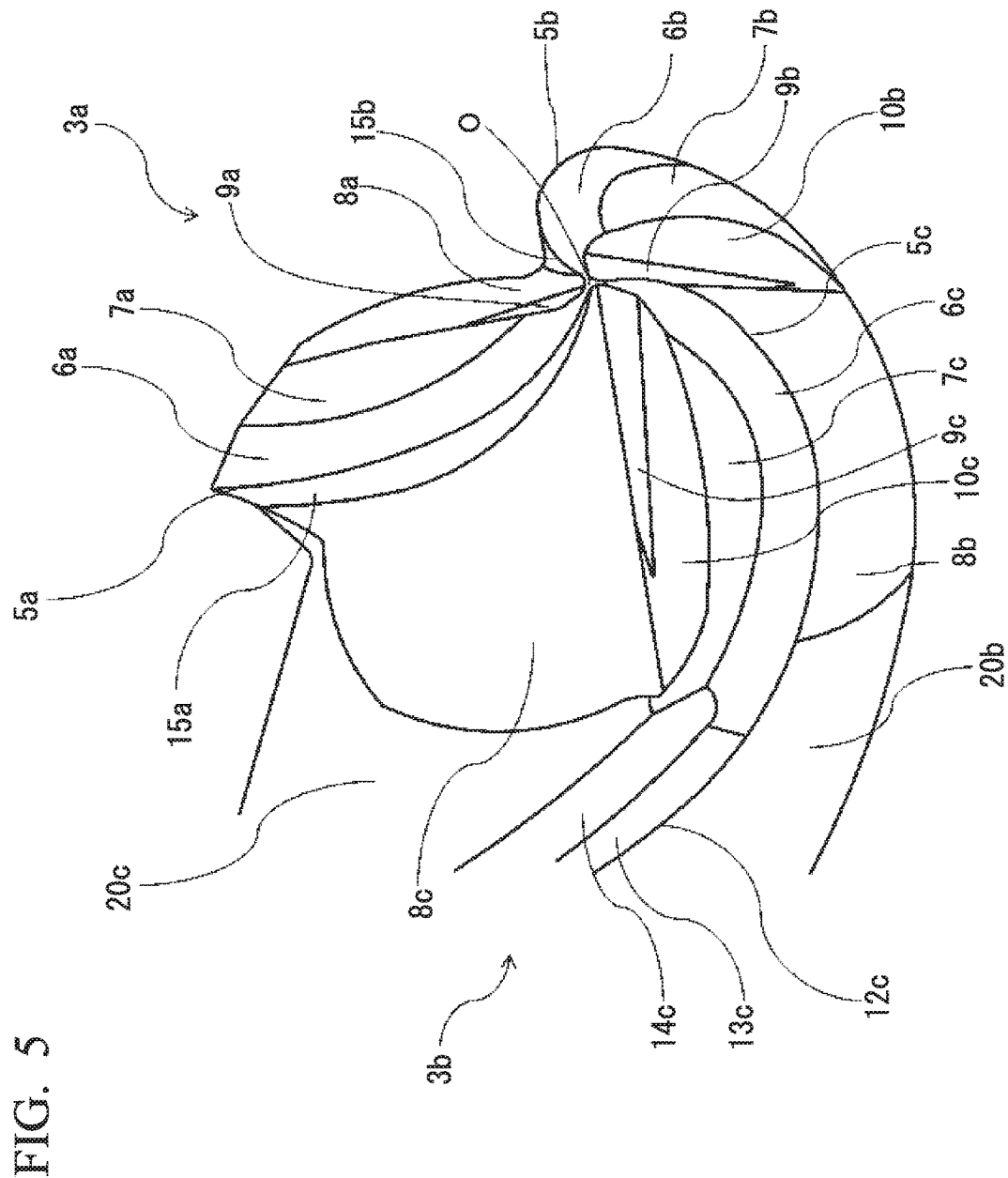
FIG. 5 is an enlarged perspective view showing a cutting edge portion of the three-flute ball end mill of FIG. 1.
Figure 6:
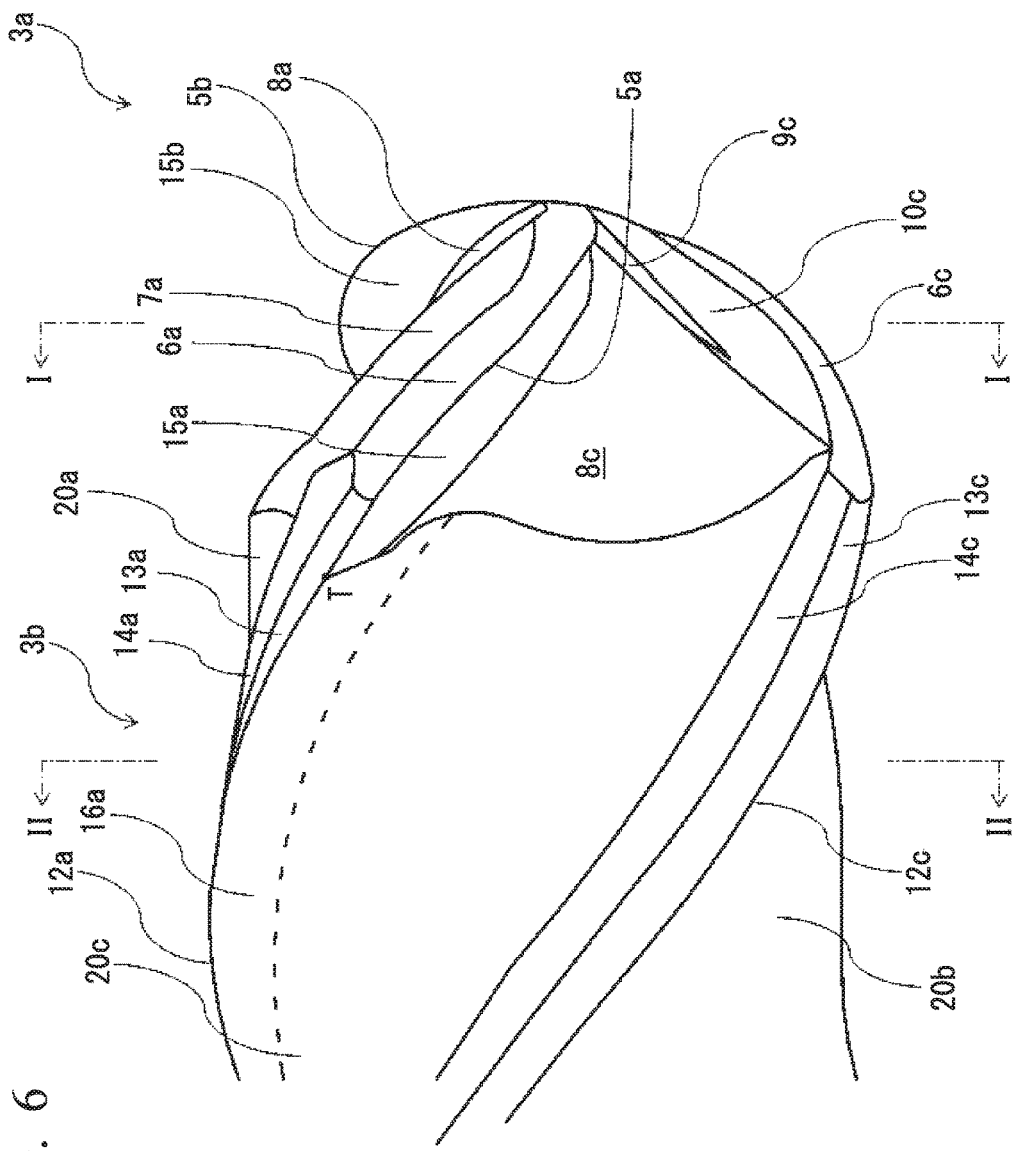
FIG. 6 is an enlarged side view showing the cutting edge portion of the three-flute ball end mill of FIG. 1.
Figure 7:
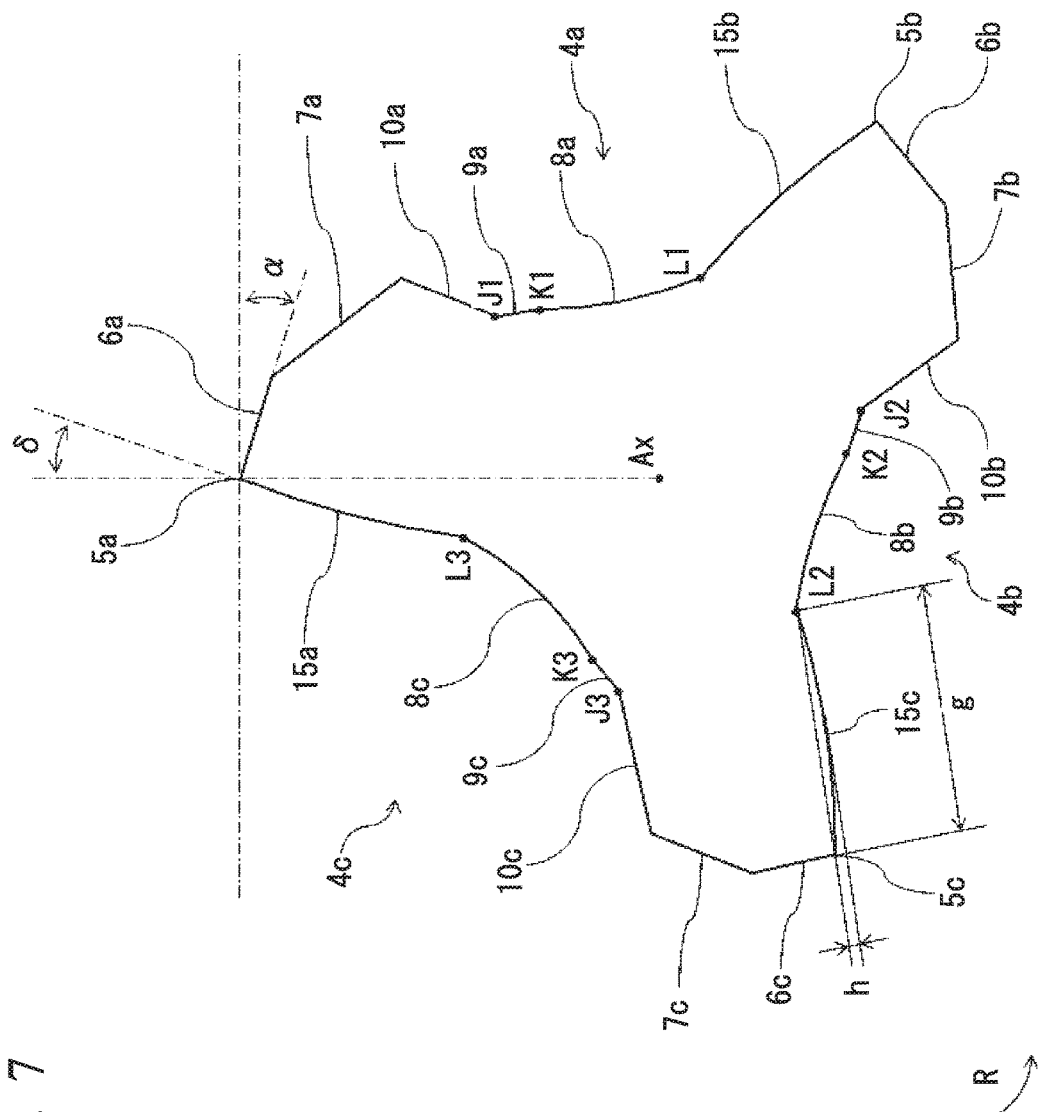
FIG. 7 is an I-I sectional view of the three-flute ball end mill of FIG. 6.
Figure 8:
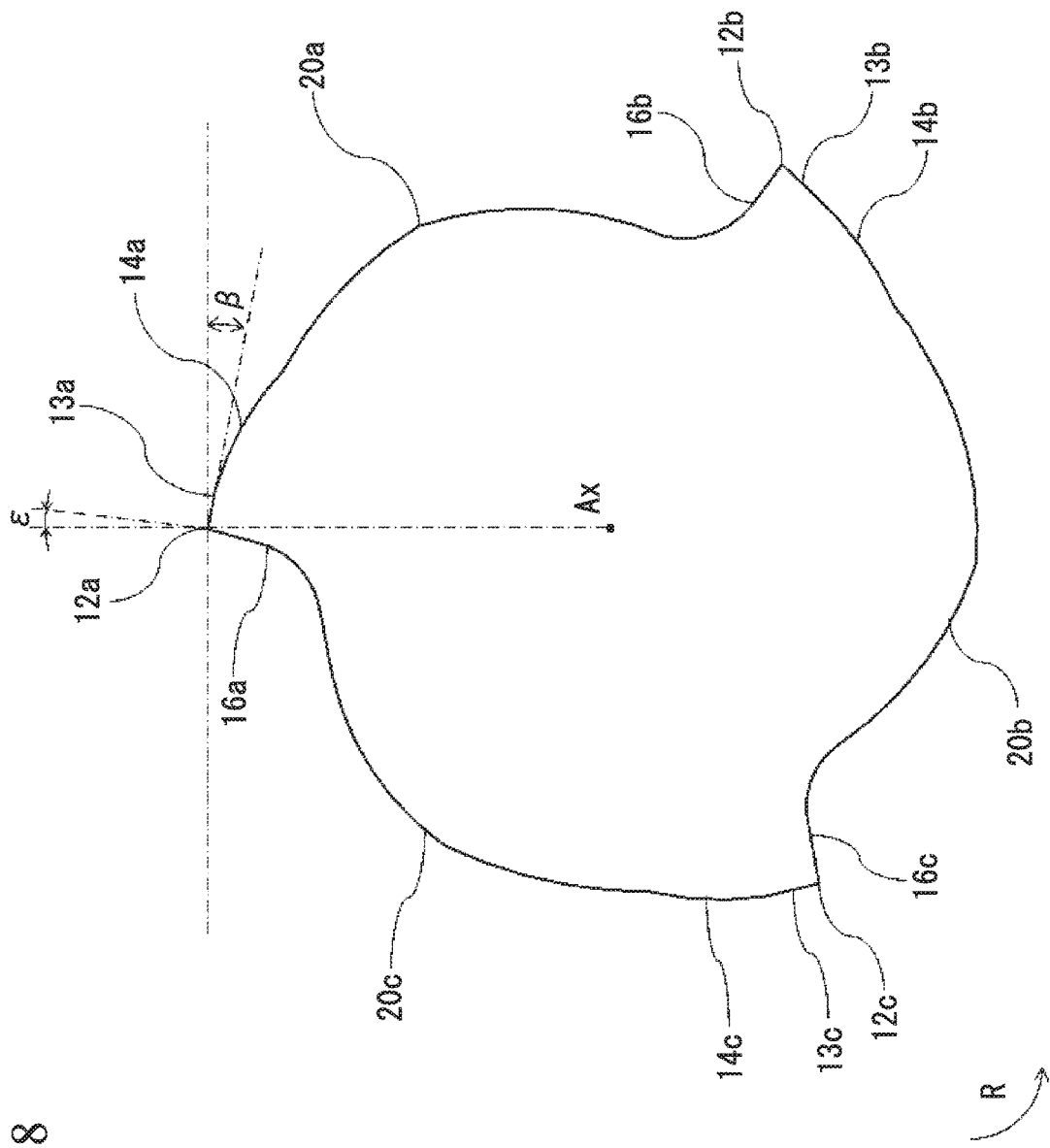
FIG. 8 is an II-II side view of the three-flute ball end mill of FIG. 6.

A three-flute ball end mill 1 that is the embodiment of the present invention will be described with reference to FIGS. 1 to 8. FIG. 1 is a side view of the three-flute ball end mill 1. FIG. 2 is a view (a front view of the three-flute ball end mill 1) of a ball edge portion 3a of the three-flute ball end mill 1 as seen from a tip side thereof. FIG. 3 is an enlarged view of FIG. 2 showing the vicinity of a rotation center point O of the ball edge portion 3a. FIG. 4 is a partially enlarged view of a second face 6a of a ball edge 5a of FIG. 3. FIG. 5 is an enlarged perspective view of a cutting edge portion 3. FIG. 6 is an enlarged side view of the cutting edge portion 3. Additionally, FIG. 7 is an I-I sectional view of FIG. 6, and FIG. 8 is an II-II sectional view of FIG. 6.

As shown in FIG. 1, the three-flute ball end mill 1 includes the cutting edge portion 3 formed on a tip side (a right side of FIG. 1) of the three-flute ball end mill 1 (hereinafter, also referred to as an end mill main body 1), and a shank portion 2 formed on a posterior end side (a left side of FIG. 1) of the end mill main body 1. The shank portion 2 has a columnar shape centered on a rotational axis Ax of the three-flute ball end mill 1. The cutting edge portion 3 has a ball edge portion 3a and a peripheral cutting edge portion 3b. The ball edge portion 3a is located at the tip of the end mill main body 1. The peripheral cutting edge portion 3b is continuous with the ball edge portion 3a, and is located between a tip portion of the shank portion 2 and a posterior end portion of the ball edge portion 3a.

As shown in FIG. 2, the ball edge portion 3a has a shape that is rotationally symmetrical at 120 degrees with respect to the rotational axis Ax. Three ball edges 5a, 5b, and 5c with a predetermined helix angle μ are formed in the ball edge portion 3a. The ball edges 5a, 5b, and 5c extend from boundary positions (points T to be described below) between the ball edge portion 3a and the peripheral cutting edge portion 3b to the vicinity of a rotation center point O. The rotation center point O is an intersection point on the tip side between the rotational axis Ax and the end mill main body 1, and is a foremost position of the end mill main body 1.

As seen from the tip side of the end mill main body 1 (FIG. 2), each of the ball edges 5a, 5b, and 5c protrudes forward in a rotational direction R of the end mill main body 1 and has a circular-arc shape having a predetermined degree of curvature. That is, each of the ball edges 5a, 5b, and 5c extends forward in the rotational direction R from a posterior end portion T thereof to the vicinity of the center thereof, and extends backward in the rotational direction R from the vicinity of the center thereof to the vicinity of the rotation center point O. Additionally, each of the ball edges 5a, 5b, and 5c is formed such that a rotation trajectory thereof around the rotational axis Ax forms one hemisphere with a diameter D which has a center on the rotational axis Ax and is convex toward the tip side of the end mill main body 1. Hereinafter, the diameter D is also referred to as the diameter of the cutting edge portion 3.

The peripheral cutting edge portion 3b has a shape that is rotationally symmetrical at 120 degrees with respect to the rotational axis Ax. In the peripheral cutting edge portion 3b, helical peripheral cutting edges 12a, 12b, and 12c (only 12b and 12c can be seen in FIG. 1) are smoothly continuous with posterior end portions T of the ball edges 5a, 5b, and 5c, respectively, have a predetermined helix angle η, and extend toward the shank portion 2 side (posterior end side). In other words, the peripheral cutting edges 12a, 12b, and 12c helically extend from the ball edges 5a, 5b, and 5c toward a back side in the rotational direction R so as to become closer to the shank portion 2. A rotation trajectory of each of the peripheral cutting edges 12a, 12b, and 12c around the rotational axis Ax becomes a cylinder centered on the rotational axis Ax. The diameter of this cylinder is equal to the diameter D of the hemisphere formed by the rotation trajectory of each of the ball edges 5a, 5b, and 5c.

As shown in FIG. 2, gashes 4a, 4b, and 4c are formed between the three ball edges 5a, 5b, and 5c, respectively. The gashes 4a, 4b, and 4c are located on back sides of the ball edges 5a, 5b, and 5c in the rotational direction R, respectively, and extend from the boundary positions between the ball edge portion 3a and the peripheral cutting edge portion 3b to the vicinity of the rotation center point O. The gashes 4a, 4b, and 4c are continuous with the ball edges 5b, 5c, and 5a on back sides of the gashes in the rotational direction R, respectively, and are continuous with second faces 6a, 6b, and 6c and third faces 7a, 7b, and 7c of the ball edges to be described below on forward sides of the gashes in the rotational direction R, respectively. As will be described below, the gashes 4a, 4b, and 4c are regions that are constituted with a plurality of faces and have a substantially trapezoidal shape as seen from the tip side of the end mill main body 1 (FIG. 2).

As shown in FIG. 1, flutes 20a, 20b, and 20c are formed between the three peripheral cutting edges 12a, 12b, and 12c. The flutes 20a, 20b, and 20c are located on back sides of the peripheral cutting edges 12a, 12b, and 12c in the rotational direction R, respectively. The flutes 20a, 20b, and 20c helically extend along the peripheral cutting edges 12a, 12b, and 12c from posterior ends of the gashes 4a, 4b, and 4c to the shank portion 2 such that the width thereof in the rotational direction R becomes substantially constant. As shown in FIGS. 5, 6, and 8, the flutes 20a, 20b, and 20c are continuous with the third faces 14a, 14b, and 14c of the peripheral cutting edges to be described below on forward sides of the flutes in the rotational direction R. The flutes 20a, 20b, and 20c are continuous with rake faces 16a, 16b, and 16c of the peripheral cutting edges to be described below on back sides of the flutes in the rotational direction R. In a cross-section (FIG. 8) perpendicular to the rotational axis Ax, the flutes 20a, 20b, and 20c have a circular-arc shape that protrudes to the outside of the end mill main body 1.

As shown in FIGS. 3 to 7, rake faces 15a, 15b, and 15c (only 15a and 15b can be seen in FIGS. 5 and 6.) are formed on the forward sides of the ball edges 5a, 5b and 5c in the rotational direction R. The rake faces 15a, 15b, and 15c are continuous with the ball edges 5a, 5b, and 5c, respectively. Additionally, the second faces 6a, 6b, and 6c of the ball edges are formed on back sides of the ball edges 5a, 5b, and 5c in the rotational direction R. The second faces 6a, 6b, and 6c are continuous with the ball edges 5a, 5b, and 5c, respectively. That is, the ball edges 5a, 5b, and 5c are formed at intersecting ridgelines between the rake faces 15a, 15b, and 15c and the second faces 6a, 6b, and 6c. Additionally, the second faces 6a, 6b, and 6c function as primary flank faces of the ball edges 5a, 5b, and 5c, respectively.

As shown in FIG. 7, the rake faces 15a, 15b, and 15c are formed such that the respective ball edges 5a, 5b, and 5c have a predetermined negative rake angle δ, and face forward in the rotational direction R. As shown in FIGS. 5 and 6, the rake faces 15a, 15b, and 15c extend along the ball edges 5a, 5b, and 5c from the vicinity of the rotation center point O to the posterior end portions T of the ball edges 5a, 5b, and 5c. Posterior ends of the rake faces 15a, 15b, and 15c are continuous with the rake faces 16a, 16b, and 16c of the peripheral cutting edges 12a, 12b, and 12c to be described below. The width of the rake faces 15a, 15b, and 15c in the rotational direction R becomes substantially zero at tip portions and posterior end portions of the rake faces 15a, 15b, and 15c, and varies smoothly so as to become the maximum in the vicinity of the centers thereof in the direction of the rotational axis Ax. In a cross-section (FIG. 7) perpendicular to the rotational axis Ax, the rake faces 15a, 15b, and 15c become curved faces that protrude forward in the rotational direction R and have a predetermined degree of curvature.

As shown in FIGS. 5 and 6, the second faces 6a, 6b, and 6c extend along the ball edges 5a, 5b, and 5c from the vicinity of the rotation center point O to the vicinities of the posterior end portions T of the ball edges 5a, 5b, and 5c. The second faces 6a, 6b, and 6c are continuous with second faces 13a, 13b, and 13c and third faces 14a, 14b, and 14c of the peripheral cutting edges to be described below at posterior ends of the second faces. The width of each of the second faces 6a, 6b, and 6c in the rotational direction R is substantially constant on the posterior end side of the second faces with respect to points V1, V2, and V3 to be described below, and becomes gradually smaller toward the tip of the second faces from the points V1, V2, and V3, and becomes zero at points Y1, Y2, and Y3 that are the tips of the second faces. As shown in FIG. 7, the second faces 6a, 6b, and 6c are formed such that the ball edges 5a, 5b, and 5c have a predetermined flank angle α. In the cross-section (FIG. 7) perpendicular to the rotational axis Ax, the second faces 6a, 6b, and 6c become straight lines.

As shown in FIGS. 2 to 5, second gash faces 9a, 9b, and 9c, gash wall faces 10a, 10b, and 10c, and the third faces 7a, 7b, and 7c of the ball edges are respectively connected to the second faces 6a, 6b, and 6c sequentially from an inner side in a radial direction (a direction passing through the rotational axis Ax and being orthogonal to the rotational axis Ax), on back sides of the second faces 6a, 6b, and 6c in the rotational direction R from the vicinity of the rotation center point O to the posterior ends of the second faces 6a, 6b, and 6c.

Tips of the second gash faces 9a, 9b, and 9c are continuous with tips of the second faces 6a, 6b, and 6c on forward sides of the second gash faces in the rotational direction R. Boundary lines between the second gash faces 9a, 9b, and 9c and the second faces 6a, 6b, and 6c are lines X1-Y1, X2-Y2, and X3-Y3 in FIG. 3. The second gash faces 9a, 9b, and 9c extend from the boundary line X1-Y1, X2-Y2, and X3-Y3, respectively, toward the peripheral cutting edge portion 3b. In addition, the points Y1, Y2, and Y3 are points (quadruple points) that serve as boundaries among the second faces 6a, 6b, and 6c of the ball edges, the second gash faces 9a, 9b, and 9c, first gash faces 8a, 8b, and 8c to be described below, and a center web portion 11 to be described below. The points X1, X2, and X3 are points (triple points) that serve as boundaries among the second faces 6a, 6b, and 6c of the ball edges, the gash wall faces 10a, 10b, and 10c, and the second gash faces 9a, 9b, and 9c.

The second gash faces 9a, 9b, and 9c are continuous with the gash wall faces 10a, 10b, and 10c on the outer sides of the second gash faces with respect to the points X1, X2, and X3 in the radial direction and on the forward side of the second gash faces in the rotational direction R. As shown in FIGS. 3 and 7, the second gash faces 9a, 9b, and 9c and the gash wall faces 10a, 10b, and 10c are connected together on boundary lines J1, J2, and J3 that extend from the points X1, X2, and X3 toward the peripheral cutting edge portion 3b. Additionally, the second gash faces 9a, 9b, and 9c are continuous with the first gash faces 8a, 8b, and 8c to be described below on back sides thereof in the rotational direction R. Boundary lines K1, K2, and K3 between the second gash faces 9a, 9b, and 9c and the first gash faces 8a, 8b, and 8c extend from the points Y1, Y2, and Y3, respectively, toward the peripheral cutting edge portion 3b. The boundary lines K1, K2, and K3 become boundary lines between the first gash faces 8a, 8b, and 8c and the gash wall faces 10a, 10b, and 10c in the vicinity of posterior ends of the second gash faces 9a, 9b, and 9c. Sides on the back sides of the second gash faces 9a, 9b, and 9c in the rotational direction R branch forward in the rotational direction R from the boundary lines K1, K2, and K3 in the vicinity of the posterior ends of the second gash faces 9a, 9b, and 9c, and intersect the boundary lines J1, J2, and J3 within the gash wall faces 10a, 10b, and 10c. That is, the second gash faces 9a, 9b, and 9c have a substantially triangular shape having the boundary line X1-Y1, X2-Y2, and X3-Y3 as bases and having apexes within the gash wall faces 10a, 10b, and 10c.

Tips of the gash wall faces 10a, 10b, and 10c are continuous with the second faces 6a, 6b, and 6c on forward sides of the gash wall faces in the rotational direction R. The gash wall faces 10a, 10b, and 10c and the second faces 6a, 6b, and 6c are connected together on posterior end sides with respect to the points X1, X2, and X3, that is, on the boundary line X1-V1, X2-V2, and X3-V3. The gash wall faces 10a, 10b, and 10c extend from the boundary line X1-V1, X2-V2, and X3-V3, respectively, to the posterior end side of the end mill main body 1. In addition, the points V1, V2, and V3 are points (triple points) that serve as boundaries among the second faces 6a, 6b, and 6c of the ball edges, the third faces 7a, 7b, and 7c of the ball edges, and the gash wall faces 10a, 10b, and 10c.

The gash wall faces 10a, 10b, and 10c are continuous with the third faces 7a, 7b, and 7c on the posterior end side of the gash wall faces with respect to the points V1, V2, and V3 and on the forward sides of the gash wall faces in the rotational direction R. Boundary lines between the gash wall faces 10a, 10b, and 10c and the third faces 7a, 7b, and 7c are circular-arc curved lines that extend from the points V1, V2, and V3 toward the peripheral cutting edge portion 3b. The gash wall faces 10a, 10b, and 10c are continuous with the first gash faces 8a, 8b, and 8c to be described below on the back sides of gash wall faces in the rotational direction R. The first gash faces 8a, 8b, and 8c and the gash wall faces 10a, 10b, and 10c are connected together at the boundary lines K1, K2, and K3. As shown in FIG. 2, as seen from the tip of the end mill main body 1, the gash wall faces 10a, 10b, and 10c are surrounded by the second faces 6a, 6b, and 6c of the ball edges, the third faces 7a, 7b, and 7c, and the first gash faces 8a, 8b, and 8c, and are formed so as to surround the second gash faces 9a, 9b, and 9c.

The third faces 7a, 7b, and 7c of the ball edges are formed on the back sides of the second faces 6a, 6b, and 6c of the ball edges in the rotational direction R in the vicinity of the center of the ball edge portion 3a slightly apart outward from the rotation center point O in the radial direction (FIGS. 2 and 3). The third faces 7a, 7b, and 7c and the second faces 6a, 6b, and 6c are connected together on boundary lines that extend from the points V1, V2, and V3 toward the peripheral cutting edge portion 3b. The third faces 7a, 7b, and 7c extend from the points V1, V2, and V3 toward the peripheral cutting edge portion 3b such that the width thereof in the rotational direction R become gradually larger until the width becomes a predetermined size. Posterior ends of the third faces 7a, 7b, and 7c are connected to the third faces 14a, 14b, and 14c of the peripheral cutting edges to be described below and the flutes 20a, 20b, and 20c.

As shown in FIG. 7, the third faces 7a, 7b, and 7c function as secondary flank faces of the ball edges 5a, 5b, and 5c. The third faces 7a, 7b, and 7c are inclined radially inward with respect to the second faces 6a, 6b, and 6c so as to have a larger flank angle than the flank angle α formed by the second faces 6a, 6b, and 6c. In the cross-section (FIG. 7) perpendicular to the rotational axis Ax, the third faces 7a, 7b, and 7c are straight lines.

As described above, the gash wall faces 10a, 10b, and 10c are formed on back sides of the third faces 7a, 7b, and 7c of the ball edges in the rotational direction R. As shown in FIG. 7, the gash wall faces 10a, 10b, and 10c are inclined radially inward with respect to the third faces 7a, 7b, and 7c, and face the back side in the rotational direction R. In the cross-section (FIG. 7) perpendicular to the rotational axis Ax, the gash wall faces 10a, 10b, and 10c are straight lines.

The first gash faces 8c, 8a, and 8b are formed on forward sides of the rake faces 15a, 15b and 15c of the ball edges in the rotational direction R, respectively. As shown in FIGS. 3 and 7, the first gash faces 8a, 8b, and 8c and the rake faces 15b, 15c, and 15a are connected together on the boundary lines L1, L2, and L3 that extend from the vicinity of the rotation center point O toward the peripheral cutting edge portion 3b. Tip-side portions of the first gash faces 8a, 8b, and 8c are continuous with the second gash faces 9a, 9b, and 9c on forward sides of the first gash faces in the rotational direction R. The first gash faces 8a, 8b, and 8c and the second gash faces 9a, 9b, and 9c are connected together on the boundary lines K1, K2, and K3 that extend from the vicinity of the rotation center point O toward the peripheral cutting edge portion 3b. The first gash faces 8a, 8b, and 8c extend from the rotation center point O toward the peripheral cutting edge portion 3b such that the width thereof in the rotational direction R becomes gradually larger, and have a substantially triangular shape as seen from the tip side of the end mill main body 1 (FIG. 2).

As shown in FIG. 7, in the cross-section perpendicular to the rotational axis Ax, the boundary lines K1, K2, and K3 are located on straight lines that connect the boundary lines J1, J2, and J3 and the boundary lines L1, L2 and L3. In the cross-section, the second gash faces 9a, 9b, and 9c are straight lines, and the first gash faces 8a, 8b, and 8c are concave circular arcs that recede slightly to the rotational axis Ax side.

The gashes 4a, 4b, and 4c are respectively constituted with four surfaces of the rake faces 15b, 15c, and 15a of the ball edges, the first gash faces 8a, 8b, and 8c, the second gash faces 9a, 9b, and 9c, and the gash wall faces 10a, 10b, and 10c, respectively, that are located on the forward sides of the above-described ball edges 5b, 5c, and 5a in the rotational direction R and are continuous in the rotational direction R.

As shown in FIGS. 1, 6, and 8, the rake faces 16a, 16b, and 16c of the peripheral cutting edges are formed on forward sides of the peripheral cutting edges 12a, 12b and 12c in the rotational direction R, respectively. The rake faces 16a, 16b, and 16c are continuous with the peripheral cutting edges 12a, 12b, and 12c, respectively. The second faces 13a, 13b, and 13c of the peripheral cutting edges are formed on the back sides of the peripheral cutting edges 12a, 12b, and 12c in the rotational direction R, respectively. The second faces 13a, 13b, and 13c are continuous with the peripheral cutting edges 12a, 12b, and 12c, respectively. That is, the peripheral cutting edges 12a, 12b, and 12c are formed at intersecting ridgelines between the rake faces 16a, 16b, and 16c and the second faces 13a, 13b, and 13c. Additionally, the second faces 13a, 13b, and 13c function as primary flank faces of the peripheral cutting edges 12a, 12b, and 12c, respectively.

The rake faces 16a, 16b, and 16c helically extend along the peripheral cutting edges 12a, 12b, and 12c from the posterior end portions T of the ball edges 5a, 5b, and 5c to the shank portion 2 such that the dimension thereof in the rotational direction R becomes substantially constant. Additionally, tips of the rake faces 16a, 16b, and 16c are continuous with the posterior ends of the rake faces 15a, 15b, and 15c of the ball edges 5a, 5b, and 5c. As shown in FIG. 8, the rake faces 16a, 16b, and 16c are formed such that the respective peripheral cutting edges 12a, 12b, and 12c have a predetermined negative rake angle ε, and face forward in the rotational direction R. In a cross-section (FIG. 8) perpendicular to the rotational axis Ax, the rake faces 16a, 16b, and 16c consist of: straight lines continuous with the peripheral cutting edges 12a, 12b and 12c; and curved lines that smoothly connect the straight lines and the flutes 20c, 20a, and 20b together and are recessed radially inward.

The second faces 13a, 13b, and 13c of the peripheral cutting edges helically extend along the peripheral cutting edges 12a, 12b, and 12c from the posterior end portions T of the ball edges 5a, 5b, and 5c to the shank portion 2 such that the dimension thereof in the rotational direction R becomes substantially constant. Additionally, tips of the second faces 13a, 13b, and 13c are continuous with the posterior ends of the second faces 6a, 6b, and 6c of the ball edges 5a, 5b, and 5c. The third faces 14a, 14b, and 14c of the peripheral cutting edges are formed on back sides of the second faces 13a, 13b, and 13c in the rotational direction R, respectively. The third faces 14a, 14b, and 14c are continuous with the second faces 13a, 13b, and 13c, respectively. The third faces 14a, 14b, and 14c helically extend along the second faces 13a, 13b, and 13c from the posterior end portions T of the ball edges 5a, 5b, and 5c to the shank portion 2 such that the dimension thereof in the rotational direction R becomes substantially constant. Additionally, tips of the third faces 14a, 14b, and 14c are continuous with the posterior ends of the second faces 6a, 6b, and 6c of the ball edges 5a, 5b, and 5c and the posterior ends of the third faces 7a, 7b, and 7c.

As shown in FIG. 8, the second faces 13a, 13b, and 13c of the peripheral cutting edges are formed such that the respective peripheral cutting edges 12a, 12b, and 12c have a predetermined flank angle β. In the cross-section (FIG. 8) perpendicular to the rotational axis Ax, the second faces 13a, 13b, and 13c become straight lines. The third faces 14a, 14b, and 14c are faces that serve as secondary flank faces of the peripheral cutting edges 12a, 12b, and 12c. The third faces 14a, 14b, and 14c are faces that are inclined radially inward with respect to the second faces 13a, 13b, and 13c so as to have a larger flank angle than the flank angle β formed by the second faces 13a, 13b, and 13c. Additionally, in the cross-section (FIG. 8) perpendicular to the rotational axis Ax, the third faces 14a, 14b, and 14c are circular arcs that protrude to the outside of the end mill main body 1, have one ends smoothly continuous with the second faces 13a, 13b, and 13c, and have the other ends continuous with the flutes 20a, 20b, and 20c.

As described above, in the three-flute ball end mill 1 of the present embodiment, the respective gashes 4a, 4b, and 4c are substantially trapezoidal chip discharge regions consisting of continuous four faces of the rake faces 15b, 15c, and 15a of the respective ball edges, the respective gash wall faces 10a, 10b, and 10c, the first gash faces 8a, 8b, and 8c, and the second gash faces 9a, 9b, and 9c. The respective gashes 4a, 4b, and 4c are formed in the ball edge portion 3a from the vicinity of the rotation center point O to a boundary portion between the ball edge portion 3a and the peripheral cutting edge portion 3b. This point is the feature of the three-flute ball end mill 1 of the present embodiment. The gash 4a will be described in detail as an example regarding this feature.

The gash 4a consists of a gash wall face 10a, a second gash face 9a, a first gash face 8a, and a rake face 15b. The gash 4a is continuous with the second face 6a and a third face 7a that are flank faces of the ball edge 5a on a forward side of the gash 4a in the rotational direction R. As shown in FIG. 3, a boundary line that extends to the vicinity of the rotation center point O in the boundary line between a flank face of the ball edge 5a and the gash 4a, that is, a boundary line V1-X1-Y1 between the second face 6a and the gash 4a is a curved line that protrudes further forward in the rotational direction R than a straight line that connects the point V1 and the rotation center point O together. In other words, the boundary line V1-X1-Y1 between the second gash face 9a and the second face 6a is located nearer to the forward side in the rotational direction R than a boundary line between the second face 6a and the third face 7a.

A boundary line X1-V1 that constitutes the boundary line V1-X1-Y1 is a substantially straight line that extends from the point V1 to the point X1, toward the forward side in the rotational direction R rather than a direction toward the rotation center point O from the point V1. A boundary line X1-Y1 consists of a straight line that extends radially outward (a direction toward the point Y1 from the rotation center point O) from the point Y1, and a curved line that smoothly connects this straight line and the boundary line X1-V1 together. The boundary line X1-V1 and the boundary line X1-Y1 are smoothly connected together at the point X1.

In this way, the second gash face 9a is on a more back side in the rotational direction R than the point Y1 which is the nearest to the rotation center point O on the second face 6a of the ball edge. In other words, one side of the second gash face 9a is the line X1-Y1 that extends substantially in the radial direction from the point Y1 nearest to the rotation center point O on the second face 6a of the ball edge. Additionally the gashes 4b and 4c also have the same configuration.

By virtue of such a feature, the second gash faces 9a, 9b, and 9c are formed such that the closer they are to the rotation center point O, the more inwardly they enter the second faces 6a, 6b, and 6c of the ball edges, respectively. For that reason, in the vicinity of the rotation center point O where chips are easily blocked, the chip discharge regions wider than the conventional multi-flute ball end mills can be secured, and thereby excellent cutting performance in rough machining is obtained.

The shape of the second gash face 9a, 9b, and 9c is not particularly limited, but is preferably a substantially triangular shape such that the width thereof in a circumferential direction (rotational direction R) becomes gradually narrower toward the outward in the radial direction from the rotation center point O side thereof as described above. Accordingly, wide chip discharge regions can be secured in the vicinity of the rotation center point O, and the width of the third faces 7a, 7b, and 7c of the respective ball edges in the circumferential direction can be made larger as the width of the second gash face 9a, 9b, and 9c in the circumferential direction becomes narrower toward the outward in the radial direction. For this reason, the rigidity of the respective ball edges 5a, 5b, and 5c is improved, and occurrence of chipping or the like during high-feed rough machining of the high-hardness material is suppressed.

As shown in FIG. 3, it is preferable to provide the center web portion 11 in the vicinity of the rotation center point O. The center web portion 11 is surrounded by the first gash faces 8a, 8b, and 8c, the second faces 6a, 6b, and 6c of the ball edges, and the rake faces 15a, 15b, and 15c. Boundary lines between the first gash faces 8a, 8b, and 8c and the center web portion 11 are circular-arc curved lines that are circumscribed on an inscribed circle W centered on the rotation center point O and that are convex toward the rotation center point O.

Boundary lines 25a, 25b, and 25c between the center web portion 11 and the second faces 6a, 6b, and 6c are respectively straight lines that extend forward in the rotational direction R from the points Y1, Y2, and Y3 to the ball edges 5a, 5b, and 5c so as to be apart from the rotation center point O. Boundary lines between the center web portion 11 and the rake faces 15a, 15b, and 15c are curved lines that connect one ends of boundary lines between the first gash faces 8a, 8b, and 8c and the center web portion 11 and one ends of the boundary lines 25a, 25b, and 25c together.

By providing the center web portion 11, the strength of the tip portions of the ball edge portion 3a is improved. The diameter of the inscribed circle W of the center web portion 11 is preferably 0.01 to 0.30 mm and is more preferably 0.02 to 0.25 mm. If the diameter of W is less than 0.01 mm, the rigidity of the center web portion 11 may be insufficient, and if the diameter of W exceeds 0.30 mm, there is a concern that the cutting performance of the respective ball edges 5a, 5b, and 5c may become worse, and excellent machined face quality may not be obtained.

As shown in FIG. 3, the point X1 is a boundary point (triple point) among the second face 6a of the ball edge, the gash wall face 10a, and the second gash face 9a. A distance H between the rotation center point O and the boundary point X1 is preferably 0.03D to 0.20D and is more preferably 0.04D to 0.12D. If the distance H is less than 0.03D, a chip discharge region in the vicinity of the rotation center point O may become narrow, that is, the size of the gash 4*a* in the vicinity of the rotation center point O may become small. For that reason, there is a concern that chipping resulting from chip clogging may occur. If the distance H exceeds 0.20D, the thickness of the respective ball edges in the vicinity of the rotation center point may become small. Therefore, there is a concern that chipping and fracture resulting from insufficient rigidity may occur. The same also applies to the points X2 and X3. That is, the distance between the point X2 and the rotation center point O and the distance between the point X3 and the rotation center point O is preferably 0.03D to 0.20D and more preferably 0.04D to 0.12D.

As shown in FIG. 3, in a case where the three-flute ball end mill 1 of the present embodiment is seen from the tip side of the ball edge portion 3*a*, when an imaginary circle P centered on the rotation center point O with a diameter 0.03D to 0.2D and passing through the gashes 4*a*, 4*b*, and 4*c* is drawn, the circle P and two adjacent ball edges 5*a* and 5*b* intersect each other at points P1 and P3. The second face 6*a* of the ball edge 5*a* and the second gash face 9*a* are arranged sequentially backward in the rotational direction R from the intersection point P1, and these faces are adjacent to each other, thereby forming the boundary line X1-Y1. The boundary line X1-Y1 and the circle P intersect each other at a point P2. In this way, the point P2 is present between the point X1 and the point Y1. A ratio of the length of a circular arc P1-P3 formed by the intersection point P1 and the intersection point P3 to the length of the circular arc P1-P2 formed by the intersection point P1 and the intersection point P2 (the length of the circular arc P1-P3/the length of the circular arc P1-P2) is preferably 3.5 to 6.0 and is more preferably 4.0 to 5.5. The larger the ratio is, the larger the occupation area (the occupation space of a chip pocket) of the gash 4*a* in the circumferential direction (rotational direction R) in the vicinity of the rotation center point O of FIG. 3 is. As a result, the chip discharge performance in the vicinity of the rotation center point O is improved. If the ratio is less than 3.5, the chip discharge regions may become narrow and there is a concern that chipping resulting from chip clogging may occur. If the ratio exceeds 6.0, the thickness of the ball edge 5*a* may become small. Therefore, there is a concern that chipping and fracture resulting from insufficient rigidity may occur. The same also applies to two adjacent ball edges 5*b* and 5*c* and two adjacent ball edges 5*c* and 5*a*. In addition, it is preferable that the above ratio fall within the above range in at least a portion of a region surrounded by a circle with a diameter 0.03D and a circle with a diameter 0.2D, which are centered on the rotation center point O, and it is more preferable that the above ratio fall within the above range in this entire region.

In FIGS. 3 and 4, the point X1 is a boundary point (triple point) among the second gash face 9*a*, the gash wall face 10*a*, and the second face 6*a* of the ball edge. When the imaginary circle X centered on the rotation center point O and passing through the boundary point X1 is drawn, a point X1' is an intersection point between an imaginary circle X and the ball edge 5*a*. The point V1 is a boundary point (triple point) where the gash wall face 10*a*, the second face 6*a* of the ball edge, and the third face 7*a* of the ball edge intersect one another. When the imaginary circle V centered on the rotation center point O and passing through the boundary point V1 is drawn, a point V1' is an intersection point between an imaginary circle V and the ball edge 5*a*. A ratio (dV/dX) of a width V1-V1' of the second face 6*a* of the ball edge 5*a* adjacent to the third face 7*a* of the ball edge 5*a* (a distance dV between the point V1 and the point V1') to a width X1-X1' of the second face 6*a* of the ball edge 5*a* adjacent to the second gash face 9*a* (a distance dX between the point X1 and the point X1') is preferably 1.1 to 4.5 and is more preferably 1.2 to 4.0. The larger the ratio is, the larger the occupation area (the occupation area of a chip pocket) of the gash 4*a* in the circumferential direction between the vicinity of the rotation center point O and the vicinity of the middle of the ball edge portion 3*a* is. As a result, the chip discharge performance is improved. In a case where the ratio is less than 1.1, there is a concern that the discharge performance of chips in the vicinity of the rotation center point O may deteriorate, and in a case where the ratio exceeds 4.5, there is a concern that chipping resulting from sufficient rigidity of the ball edge 5*a* in the vicinity of the rotation center point O may occur. The ratio is applied similar to the other ball edges 5*b* and 5*c*.

In FIG. 2, when an imaginary circle S centered on the rotation center point O with a diameter 0.4D to 0.6D (D is the diameter of the cutting edge portion) and passing through the gashes 4*a*, 4*b*, and 4*c* is drawn, the circle S and two adjacent ball edges 5*a* and 5*b* intersect each other at a point S1 and a point S3. In addition, in FIG. 2, the circle S is a circle with a diameter 0.5D. The second face 6*a* of the ball edge 5*a*, the third face 7*a* of the ball edge 5*a*, and the gash wall face 10*a* are arranged sequentially backward in the rotational direction R from the point S1 and are adjacent to each other. A boundary line between the third face 7*a* of the ball edge 5*a* and the gash wall face 10*a* and the circle S intersect each other at a point S2. A ratio (the length of a circular arc S1-S3/the length of a circular arc S1-S2) of the length of the circular arc S1-S3 to the length of the circular arc S1-S2 is preferably 2.1 to 3.3 and is more preferably 2.2 to 3.1. The larger the ratio is, the larger the occupation area (the occupation space of a chip pocket) of the gash 4*a* in the circumferential direction (rotational direction R) in the vicinity of the middle of the ball edge portion 3*a* (the vicinity of a middle portion in the direction of the rotational axis Ax) is. Therefore, the chip discharge performance is improved, and the third face 7*a* in the vicinity of the center of the ball edge portion 3*a* can also be formed widely. For that reason, edge tip rigidity can be enhanced. If the ratio is less than 2.1, there is a concern that the discharge performance of chips may deteriorate, and if the ratio exceeds 3.3, there is a concern that chipping resulting from sufficient rigidity of the ball edge may occur. Regarding the above ratio, the same also applies to the two adjacent ball edges 5*b* and 5*c* and the two adjacent ball edges 5*c* and 5*a*. In addition, it is preferable that the above ratio fall within the above range in at least a portion of a region surrounded by a circle with a diameter 0.4D and a circle with a diameter 0.6D, which are centered on the rotation center point O, and it is more preferable that the above ratio fall within the above range in this entire region.

In FIG. 2, a perpendicular line is drawn from an apex U1 (a point on a convex curved line of which the distance from the line segment O-T is the longest) on a convex curved face (a convex curved line, a circular arc) of the ball edge 5*b* on a line segment O-T connecting the rotation center point O and a terminal point T of the ball edge 5*b*, and an intersection point between the perpendicular line and the line segment O-T is defined as U2. A ratio (the length of the line segment U1-U2/the length of the line segment O-T×100%) of the length of a line segment U1-U2 to the length of the line segment O-T is defined as the degree of curvature of the ball edge 5*b*. The degree of curvature is 35% to 55% and is preferably 40% to 50%. If the degree of curvature is less than 35%, a chip pocket becomes too small, and if the degree of curvature exceeds 55%, the rigidity of the ball edge is insufficient. The terminal point T of the ball edge 5b is an intersection point between the ball edge 5b and the peripheral cutting edge 12b. In the present embodiment, in the case of FIGS. 2 and 3, the length in the direction of the rotational axis Ax from the tip (rotation center point O) of the ball edge portion 3a to the terminal point T thereof is set to 0.5D. However, this length can be appropriately changed depending on design specifications. The specification of the above degree of curvature is also similarly applied to the other ball edges 5a and 5c.

In the three-flute ball end mill 1 of the present embodiment, even if high-feed rough machining is performed on a high-hardness difficult-to-cut material, in order to lessen chipping and fracture and obtain long lifespan, it is preferable that the respective peripheral cutting edges 12a to 12c have the helix angle η (for example, η=40°) of 35° to 45°, the helix angle μ of the respective ball edges 5a to 5c satisfy a relationship of η−μ≤7° with respect to the helix angle η (for example, μ=36°), and both be smoothly connected with each other. Here, the "helix angle μ" of the respective ball edges is a helix angle measured within a range of 0.02D in a tip direction of the ball edge portion 3a along the rotational axis Ax of the end mill main body 1 from terminal points (T in FIGS. 1 and 2) of the respective ball edges 5a, 5b, and 5c, unless particularly mentioned.

In the three-flute ball end mill 1 of the present embodiment, in order to improve the cutting performance of the peripheral cutting edges 12a to 12c and enhance rigidity to suppress chipping during side surface cutting in high-feed rough machining of a high-hardness difficult-to-cut material, the helix angle η of the respective peripheral cutting edges 12a to 12c is preferably within a range of 35° to 45° and is more preferably within a range of 37° to 43°. As shown in FIG. 1, the helix angle η is an angle formed between the respective peripheral cutting edges 12a to 12c and the rotational axis Ax. If the helix angle η of the peripheral cutting edges 12a to 12c is less than 35°, the resistance applied to the respective peripheral cutting edges may become large, and thus there is a concern that chipping may occur. On the other hand, if the helix angle η is larger than 45°, there is a concern that chattering vibration resulting from a load increase applied to a work material may be generated and deterioration of the machined face quality may be caused.

As shown in FIG. 1, it is preferable that the helix angle μ of the respective ball edges 5a to 5c satisfy a relationship of η−μ≤7° with respect to the helix angle η of the respective peripheral cutting edges 12a to 12c. If η−μ>7° is satisfied, the cutting edges may be largely curved at the coupling points T (terminal points of the ball edges and starting points of the peripheral cutting edges) between the respective peripheral cutting edges 12a to 12c and the respective ball edges 5a to 5c, which may cause chipping or fracture. η−μ≤6° is more preferable, and η−μ≤5° is particularly preferable. In addition, it is preferable that the lower limit of the difference η−μ of the helix angle be 0°.

As shown in an I-I cross-section (a cross-section at a position apart by 0.15D in the direction of the rotational axis Ax from the tip (rotation center point O) of the ball edge portion 3a) shown in FIG. 7, it is preferable that the rake faces 15a to 15c of the respective ball edges 5a to 5c be in a convex curved face forward in the rotational direction R. The degree of curvature of a convex curved face of each of the rake faces 15a to 15c is expressed by a ratio h/g (in FIG. 7, g and h only regarding the rake face 15c are shown) of a length h of a perpendicular line drawn to a line segment connecting both ends (an outer end and an inner end of each of the rake faces 15a to 15c in the radial direction) of the convex curved face from an apex (a point on a convex curved face (on a convex curved line in FIG. 7) of which the distance from the line segment is the maximum) of the convex curved face with respect to a length g of the line segment. It is preferable that the degree h/g of curvature of the convex curved face of each of the rake faces 15a to 15c be 1% to 10% (for example, 3%). If the degree h/g of curvature is less than 1%, the rigidity and the edge tip strength of the ball edge portion 3a may be insufficient. If the degree h/g of curvature exceeds 10%, the cutting performance may deteriorate, and therefore there is a concern that fracture resulting from adhesion may be apt to occur. A more preferable range of the degree h/g of curvature is 1% to 8%.

In FIG. 7, a radial rake angle δ (in FIG. 7, only the rake angle δ of the ball edge 5a is shown.) of the respective ball edges 5a to 5c is preferably −29° to −11° (for example, δ=−19° and is more preferably −26° to −14°. If the radial rake angle of the respective ball edges 5a to 5c is less than −29°, the cutting performance of the respective ball edges 5a to 5c may become insufficient, and if the radial rake angle exceeds −11°, the rigidity and the edge tip strength of the respective ball edges 5a to 5c may become low. In both cases, there is a concern that stable cutting of the high-hardness material may become difficult. In addition, the radial rake angle δ of the ball edge 5a is an angle formed between a tangent line of the rake face 15a at the ball edge 5a, and a straight line passing through the rotational axis Ax and the ball edge 5a, in the sectional view shown in FIG. 7. The same applies to the radial rake angle of the ball edges 5b and 5c.

In FIG. 7, a flank angle α (in FIG. 7, only the flank angle α of the ball edge 5a) of the respective ball edges 5a to 5c is preferably 6° to 23° (for example, α=12°), and is more preferably 8° to 21°. If the flank angle is less than 6°, there is a concern that cutting resistance may become high, and chattering vibration may be apt to occur in high efficiency cutting. On the other hand, if the flank angle exceeds 23°, the cutting resistance decreases. However, there is a concern that the rigidity of the respective ball edges 5a to 5c may decrease and chipping and fracture may be apt to occur in high-efficiency cutting. In addition, the flank angle α of the ball edge 5a is an angle formed between a straight line passing through the ball edge 5a and the rotational axis Ax and the second face 6a of the ball edge 5a, in the sectional view shown in FIG. 7. The same applies to the flank angle of the ball edges 5b and 5c.

In an II-II cross-section (a cross-section at a position apart by 0.75D in the direction of the rotational axis Ax from the tip (rotation center point O) of the ball edge portion 3a) shown in FIG. 8, a radial rake angle ε of the respective peripheral cutting edges 12a to 12c (in FIG. 8, only the rake angle ε of the peripheral cutting edge 12a is shown) is preferably −9° to −1° (for example, ε=−5°) and is more preferably −7° to −3°. If the radial rake angle of the respective peripheral cutting edges 12a to 12c is less than −9°, the cutting performance of the respective peripheral cutting edges 12a to 12c may become insufficient, and if the radial rake angle exceeds −3°, the rigidity and the edge tip strength of the respective peripheral cutting edges 12a to 12c may become low. In both cases, there is a concern that stable cutting of the high-hardness material may become difficult. In addition, the rake angle ε of the peripheral cutting edge 12a is an angle between a tangent line of the rake face 16a at the peripheral cutting edge 12a and a straight line passing through the rotational axis Ax and the peripheral cutting edge 12a, in the sectional view shown in FIG. 8. The same applies to the rake angle of the peripheral cutting edges 12b and 12c.

In FIG. 8, a flank angle β of the respective peripheral cutting edges 12a to 12c (in FIG. 8, only the flank angle β of the peripheral cutting edge 12a is shown) is preferably 6° to 23° (for example, β=11°) and is more preferably 8° to 21°. If the flank angle is less than 6°, there is a concern that the cutting resistance may become high and chattering vibration may be apt to occur in high efficiency cutting. On the other hand, if the flank angle exceeds 23°, the cutting resistance decreases. However, the rigidity of the respective peripheral cutting edges 12a to 12c may decrease. Therefore, there is a concern that chipping and fracture may be apt to occur in high-efficiency cutting. In addition, the flank angle α of the peripheral cutting edges 12a to 12c is an angle between the peripheral cutting edges 12a to 12c and the second faces 13a, 13b, and 13c, in the sectional view shown in FIG. 8.

Although the multi-flute ball end mill that is the embodiment of the invention has been described above, the invention is not limited to this, and can be appropriately changed without departing from the technical idea of the invention. For example, although the three-flute ball end mill has been described in the above embodiment, the invention is not limited to this. For example, multi-flute ball end mills in which the configuration of the gashes, and the like are made to be the same configuration as the three-flute ball end mill of the above embodiment except for changing the number of edges to four, five, six or the like, also exhibit the effects of the invention.

INDUSTRIAL APPLICABILITY

According to the multi-flute ball end mill related to the present invention, reduction of the cutting resistance and improvement of the chip discharge performance during rough machining can be simultaneously achieved. For that reason, even in a case where high-feed rough machining is performed on high-hardness work materials, such as hot-forged steel used for various kinds of metal dies, high-quality machined surfaces can be obtained.

REFERENCE SIGNS LIST

1: THREE-FLUTE BALL END MILL (END MILL MAIN BODY)
2: SHANK PORTION
3: CUTTING EDGE PORTION
3a: BALL EDGE PORTION
3b: PERIPHERAL CUTTING EDGE PORTION
4a, 4b, 4c: GASH
5a, 5b, 5c: BALL EDGE
6a, 6b, 6c: SECOND FACE OF BALL EDGE
7a, 7b, 7c: THIRD FACE OF BALL EDGE
8a, 8b, 8c: FIRST GASH FACE
9a, 9b, 9c: SECOND GASH FACE
10a, 10b, 10c: GASH WALL FACE
11: CENTER WEB PORTION
12a, 12b, 12c: PERIPHERAL CUTTING EDGE
13a, 13b, 13c: SECOND FACE OF PERIPHERAL CUTTING EDGE
14a, 14b, 14c: THIRD FACE OF PERIPHERAL CUTTING EDGE
15a, 15b, 15c: RAKE FACE OF BALL EDGE
16a, 16b, 16c: RAKE FACE OF PERIPHERAL CUTTING EDGE
20a, 20b, 20c: FLUTE
25a, 25b, 25c: BOUNDARY LINE BETWEEN CENTER WEB PORTION AND FLANK FACE (SECOND FACE) OF BALL EDGE
Ax: ROTATIONAL AXIS
D: DIAMETER OF CUTTING EDGE PORTION
H: DISTANCE BETWEEN ROTATION CENTER POINT AND BOUNDARY POINT X1
J1, J2, J3: BOUNDARY LINE BETWEEN GASH WALL FACE AND SECOND GASH FACE
K1, K2, K3: BOUNDARY LINE BETWEEN FIRST GASH FACE AND SECOND GASH FACE
L1, L2, L3: BOUNDARY LINE BETWEEN FIRST GASH FACE AND RAKE FACE OF BALL EDGE
O: ROTATION CENTER POINT
P: IMAGINARY CIRCLE
P1, P3: INTERSECTION POINT BETWEEN TWO ADJACENT BALL EDGES AND CIRCLE P
P2: INTERSECTION POINT BETWEEN BOUNDARY LINE FORMED BY SECOND FACE AND SECOND GASH FACE OF BALL EDGE, AND CIRCLE P
R: ROTATIONAL DIRECTION
S: IMAGINARY CIRCLE HAVING LENGTH OF 50% OF TOOL DIAMETER (DIAMETER D OF CUTTING EDGE PORTION) AS DIAMETER
S1, S3: INTERSECTION POINT OF TWO ADJACENT BALL EDGES AND IMAGINARY CIRCLE S
S2: INTERSECTION POINT BETWEEN BOUNDARY LINE FORMED BY THIRD FACE OF BALL EDGE AND GASH WALL, AND IMAGINARY CIRCLE S
T: TERMINAL POINT OF BALL EDGE
U1: APEX OF CONVEX CURVED FACE OF BALL EDGE
U2: TERMINAL POINT OF PERPENDICULAR LINE DRAWN FROM APEX OF CONVEX CURVED FACE OF BALL EDGE TO LINE SEGMENT O-T
V: IMAGINARY CIRCLE PASSING THROUGH POINTS V1, V2, V3
V1, V2, V3: BOUNDARY POINT (TRIPLE POINT) AMONG SECOND FACE OF BALL EDGE, THIRD FACE OF BALL EDGE, AND GASH WALL FACE
X: IMAGINARY CIRCLE PASSING THROUGH POINTS X1, X2, AND X3
X1, X2, X3: BOUNDARY POINT (TRIPLE POINT) AMONG SECOND FACE OF BALL EDGE, GASH WALL FACE, AND SECOND GASH FACE
Y1, Y2, Y3: BOUNDARY POINT (QUADRUPLE POINT) AMONG SECOND FACE OF BALL EDGE, SECOND GASH FACE, FIRST GASH FACE, AND CENTER WEB PORTION
W: INSCRIBED CIRCLE OF CENTER WEB PORTION
g: LENGTH OF CONVEX CURVED FACE
h: HEIGHT OF CONVEX CURVED FACE
α: FLANK ANGLE OF BALL EDGE
β: FLANK ANGLE OF PERIPHERAL CUTTING EDGE
δ: RADIAL RAKE ANGLE OF BALL EDGE
ε: RADIAL RAKE ANGLE OF PERIPHERAL CUTTING EDGE

The invention claimed is:
1. A multi-flute ball end mill, comprising:
a shank portion configured to rotate about a rotational axis;
a cutting edge portion having a ball edge portion at a tip thereof;

three or more ball edges formed on the ball edge portion of the cutting edge portion;

three or more gashes formed between the respective ball edges;

three or more peripheral cutting edges continuous with end portions of the ball edges on the shank portion side; and three or more flutes formed between the respective peripheral cutting edges continuously with the respective gashes, wherein a degree of curvature of each of the ball edges is 35% to 55%, the degree being a ratio of a length of a perpendicular line drawn from an apex of a convex curved line of each of the ball edges to a line segment connecting a rotation center point that is an intersection point between the rotational axis and the cutting edge portion with a terminal point of each of the ball edges on the shank portion side with respect to a length of the line segment, wherein each of the gashes includes four faces of a rake face of each of the ball edges, a gash wall face, a first gash face, and a second gash face, the four faces being continuous in a rotational direction of the multi-flute ball end mill, and wherein the second gash face is formed such that the closer the second gash face is to the rotation center point, the more inwardly the second gash face enters a second face of each of the ball edges continuous with a back side of each of the ball edges in the rotational direction.

2. The multi-flute ball end mill according to claim 1, wherein, in a case where the multi-flute ball end mill is seen from the tip side thereof, when a circle P centered on the rotation center point O with a diameter of 0.03D to 0.2D where D is the diameter of the cutting edge portion and passing through the gashes is drawn, the second face of each of the ball edges and the second gash face are continuous in this order on a back side of each of the ball edges in the rotational direction on the circumference of the circle P; and a ratio of a length of a circular arc P1-P3 with respect to a length of a circular arc P1-P2 is 3.5 to 6.0, the circular arc P1-P3 being formed by intersection points P1 and P3 where a first ball edge and a second ball edge adjacent to each other intersect with the circle P, and the circular arc P1-P2 being formed by the intersection point P1 and an intersection point P2 that is located on the circumference of the circle P and forms a boundary between the second face of the first ball edge and the second gash face.

3. The multi-flute ball end mill according to claim 1, wherein, in a case where the multi-flute ball end mill is seen from the tip side thereof, when a circle S centered on the rotation center point O with a diameter of 0.4D to 0.6D where D is the diameter of the cutting edge portion and passing through the gashes is drawn, the second face of each of the ball edges, a third face of each of the ball edges, and the gash wall face are continuous in this order on a back side of each of the ball edges in the rotational direction on the circumference of the circle S; and a ratio of a length of a circular arc S1-S3 with respect to a length of a circular arc S1-S2 is 2.1 to 3.3, the circular arc S1-S3 being formed by intersection points S1 and S3 where a first ball edge and a second ball edge adjacent to each other intersect with the circle S, and the circular arc S1-S2 being formed by the intersection point S1 and an intersection point S2 that is located on the circumference of the circle S and forms a boundary between the third face of the first ball edge and the gash wall face.

4. The multi-flute ball end mill according to claim 1, wherein at a position apart from the rotation center point toward the shank portion in a direction of the rotational axis by 0.15D where D is the diameter of the cutting edge portion, a radial rake angle of each of the ball edges is −29° to −11°; and a rake angle of each of the peripheral cutting edges is −9° to −1°.

5. The multi-flute ball end mill according to claim 2, wherein, in a case where the multi-flute ball end mill is seen from the tip side thereof, when a circle S centered on the rotation center point O with a diameter of 0.4D to 0.6D where D is the diameter of the cutting edge portion and passing through the gashes is drawn, the second face of each of the ball edges, a third face of each of the ball edges, and the gash wall face are continuous in this order on a back side of each of the ball edges in the rotational direction on the circumference of the circle S; and a ratio of a length of a circular arc S1-S3 with respect to a length of a circular arc S1-S2 is 2.1 to 3.3, the circular arc S1-S3 being formed by intersection points S1 and S3 where a first ball edge and a second ball edge adjacent to each other intersect with the circle S, and the circular arc S1-S2 being formed by the intersection point S1 and an intersection point S2 that is located on the circumference of the circle S and forms a boundary between the third face of the first ball edge and the gash wall face.

6. The multi-flute ball end mill according to claim 2, wherein at a position apart from the rotation center point toward the shank portion in a direction of the rotational axis by 0.15D where D is the diameter of the cutting edge portion, a radial rake angle of each of the ball edges is −29° to −11°; and a rake angle of each of the peripheral cutting edges is −9° to −1°.

7. The multi-flute ball end mill according to claim 3, wherein at a position apart from the rotation center point toward the shank portion in a direction of the rotational axis by 0.15D where D is the diameter of the cutting edge portion, a radial rake angle of each of the ball edges is −29° to −11°; and a rake angle of each of the peripheral cutting edges is −9° to −1°.

8. The multi-flute ball end mill according to claim 5, wherein at a position apart from the rotation center point toward the shank portion in a direction of the rotational axis by 0.15D where D is the diameter of the cutting edge portion, a radial rake angle of each of the ball edges is −29° to −11°; and a rake angle of each of the peripheral cutting edges is −9° to −1°.

* * * * *